(12) United States Patent
Huis (10) Patent No.: US 8,187,107 B2
(45) Date of Patent: May 29, 2012

(54) PUSH BUTTON QUICK DISCONNECT YOKE

(75) Inventor: Lou R. Huis, West Chester, PA (US)

(73) Assignee: Neapco LLC, Pottstown, PA (US)

( * ) Notice: Subject to any disclaimer, the term of this patent is extended or adjusted under 35 U.S.C. 154(b) by 284 days.

(21) Appl. No.: 12/502,928

(22) Filed: Jul. 14, 2009

(65) Prior Publication Data

US 2010/0120545 A1 May 13, 2010

Related U.S. Application Data

(60) Provisional application No. 61/080,481, filed on Jul. 14, 2008.

(51) Int. Cl.
*F16D 3/26* (2006.01)
*B23P 11/00* (2006.01)
(52) U.S. Cl. ............................ 464/134; 464/901; 29/428
(58) Field of Classification Search ................. 464/134, 464/135, 182, 901; 403/57, 322.4, 359.1–360; 29/428
See application file for complete search history.

(56) References Cited

U.S. PATENT DOCUMENTS

| | | | | |
|---|---|---|---|---|
| 3,625,548 A | * | 12/1971 | Boehm | 403/322.4 |
| 3,966,239 A | * | 6/1976 | Heckenkamp | |
| 4,157,019 A | * | 6/1979 | von Allworden | 464/901 |
| 4,169,686 A | * | 10/1979 | Balensiefen et al. | 464/901 |

* cited by examiner

*Primary Examiner* — Gregory Binda
*Assistant Examiner* — Josh Skroupa
(74) *Attorney, Agent, or Firm* — Marshall, Gerstein & Borun LLP

(57) ABSTRACT

A quick disconnect yoke assembly is provided that includes a yoke having a cylindrical hub and a splined bore passing through the hub. A disconnect lever may be pivotably secured to the hub and may include an first arm and a second arm. The disconnect lever may be biased in a first position by a return spring. In the first position, the first arm may be positioned in a circumferential groove formed between a first splined portion and a second splined portion of a shaft that is received in the bore. When an inward radial force is applied to the second arm, the disconnect lever pivots to a second position in which the first portion is outside of the circumferential groove, thereby allowing the shaft to be inserted or removed from the bore.

28 Claims, 5 Drawing Sheets

PUSH BUTTON QUICK DISCONNECT YOKE

FIELD OF THE DISCLOSURE

This disclosure relates generally to shaft assemblies for power transmission, and, more particularly, to a push button quick disconnect yoke for a power transmission shaft assembly.

BACKGROUND OF THE INVENTION

Shaft assemblies may be used to transmit driving torque from a source to a load. For example, shaft assemblies may be used to transmit power from the power take-off (PTO) coupled to the transmission of a lawn and garden tractor to a rotary implement, such as a mower deck. A shaft assembly may include a longitudinal shaft portion, a first universal joint disposed at a first end of the shaft portion, and a second universal joint disposed at a second end of the shaft portion. The shaft portion may include a sliding or "free motion portion" to allow for small changes in shaft length during operation of the implement and to facilitate installation of the shaft. In one common configuration, the first universal joint may be fixedly secured to the PTO, and the second universal joint may be removably coupled to a splined shaft portion of the rotary implement. However, the first universal joint may be fixedly secured to the rotary implement, and the second universal joint may be removably coupled to a splined shaft portion of the PTO. Each of the first and second universal joints may include a first yoke and a second yoke and may incorporate a spider or bearing assembly allowing free rotation and articulation of the shaft assembly relative to the implement and/or the PTO.

It is often necessary to disconnect the shaft assembly from the PTO and rotary implement in order to change the rotary implement or to perform maintenance on the rotary implement. To facilitate the installation and removal of the shaft assembly, a quick disconnect or release mechanism is commonly incorporated in one of the yokes comprising the first and/or second universal joint. For example, the yoke may incorporate a spring-loaded detent actuated by a button extending outwardly from a collar surface of the yoke. Alternatively, the release may include a sliding collar or a twisting collar that couples the shaft to the yoke.

BRIEF SUMMARY OF THE DISCLOSURE

In an embodiment of the present disclosure, a quick disconnect yoke assembly includes a yoke adapted to engage a universal joint, and a bore is formed along a longitudinal axis of the yoke. A shaft having a splined portion including a plurality of teeth and a circumferential groove disposed adjacent the splined portion is adapted to be received into the bore. A disconnect lever is pivotably coupled to the yoke about a longitudinal hinge and is pivotable between a first position and a second position. The disconnect lever has a first arm and a second arm. In the first position, the first arm engages the circumferential groove of the shaft such that if an outward longitudinal force is applied to the shaft, a surface of the first arm contacts a surface of one of the plurality of teeth of the splined portion of the shaft, thereby locking the shaft within the yoke. An inward radial force applied to the second arm causes the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke. A line connecting a center point of the hinge and a center line of the shaft intersects a portion of a distal end of the first arm of the disconnect lever.

In a further embodiment of the present disclosure, the line connecting the center point of the hinge and the center line of the shaft may be colinear with a center line of the distal end of the first arm of the disconnect lever.

In a still further embodiment of the present disclosure, the line connecting the center point of the hinge and the center line of the shaft may be substantially colinear with a center line of the distal end of the first arm of the disconnect lever.

In another embodiment of the present disclosure, the line connecting the center point of the hinge and the center line of the shaft may intersect the middle fifty percent of the distal end of the first arm of the disconnect lever.

In still another embodiment of the present disclosure, the portion of the distal end of the first arm of the disconnect lever comprises an arm protrusion, and the line connecting the center point of the hinge and the center line of the shaft intersects the middle fifty percent of the arm protrusion.

In yet another embodiment of the present disclosure, the splined portion of the shaft may include a first splined portion, and the circumferential groove of the shaft may be disposed between the first splined portion and a second splined portion.

In one more embodiment of the present disclosure, the hinge pivotably coupling the disconnect lever to the yoke may extend through a central portion of the disconnect lever.

In a further embodiment of the present disclosure, the first arm may extend from the central portion in a first direction and the second arm may extend from the central portion in a second direction.

In a still further embodiment of the present disclosure, the yoke may include a hub having a substantially cylindrical outer surface, and an outer surface of the second arm of the disconnect lever may be substantially co-extensive with the outer surface of the hub when the disconnect lever is in the first position.

In one more embodiment of the present disclosure, the disconnect lever may be disposed within a lever pocket formed in the yoke.

In another embodiment of the present disclosure, a radial spring bore may be formed in the yoke and may extend through a surface defining the lever pocket.

In yet another embodiment of the present disclosure, a spring may be disposed in the spring bore, wherein the spring may bias the disconnect lever in the first position.

In a further embodiment of the present disclosure, the spring may provide an inward radial force on a surface of the first arm to bias the disconnect lever in the first position.

In a still further embodiment of the present disclosure, a surface of the first arm of the disconnect lever may engage a stop pin disposed within the lever pocket to maintain the disconnect lever in the first position.

In another embodiment of the present disclosure, a second stop surface disposed adjacent to a distal end of the second arm of the disconnect lever may engage a surface defining the lever pocket to maintain the disconnect lever in the second position.

In yet another embodiment of the present disclosure, the first arm may include a ramped surface, and the ramped surface may allow the disconnect lever to be pivoted from the first position to the second position by one of the plurality of teeth of the splined portion of the shaft as the shaft is inserted into the bore.

In a still further embodiment of the present disclosure, the circumferential groove may extend around the entire circumference of the shaft.

In another embodiment of the present disclosure, the yoke and hub may be integrally formed.

In an embodiment of the present disclosure, a method for disconnecting and connecting a shaft to a yoke of a universal joint includes providing the yoke of the universal joint, and the yoke includes a longitudinal bore adapted to receive a shaft. The method further includes pivotably coupling a disconnect lever to the yoke such that when the disconnect lever is in a first position, the shaft can be inserted or removed from the bore of the yoke, and when the disconnect lever is in a second position, the shaft is secured within the bore of the yoke.

In a further embodiment of the present disclosure, the shaft may include a splined first portion having a plurality of teeth, a splined second portion having a plurality of teeth, and a circumferential groove disposed between the first portion and the second portion. The disconnect lever may include a first arm and a second arm.

In a still further embodiment of the present disclosure, in the first position, the first arm may engage the circumferential groove of the shaft such that if an outward longitudinal force is applied to the shaft, a surface of the first arm contacts a surface of one of the plurality of teeth of the splined portion of the shaft, thereby locking the shaft within the yoke.

In yet another embodiment of the present disclosure, an inward radial force applied to the second arm may cause the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke.

In one more embodiment of the present disclosure, the method may include biasing the disconnect lever in the first position using a spring.

In a further embodiment of the present disclosure, the method may include providing a force to the disconnect lever to pivot the lever from the first position to the second position.

In a still further embodiment of the present disclosure, the method may also include aligning a pivoting axis of the disconnect lever, a center line of the shaft, and a first arm of the disconnect lever such that a line connecting the pivoting axis of the disconnect lever and the center line of the shaft intersects a portion of a distal end of the first arm of the disconnect lever.

In an embodiment of the present disclosure, a quick disconnect yoke assembly includes a yoke adapted to engage a universal joint, and a bore is formed along a longitudinal axis of the yoke. The bore is adapted to receive a splined portion of a shaft, and the splined portion of the shaft includes a plurality of teeth. A disconnect lever is pivotably coupled to the yoke about a longitudinal hinge and is pivotable between a first position and a second position. The disconnect lever has a first arm and a second arm. In the first position, the first arm is disposed adjacent to the splined portion such that if an outward longitudinal force is applied to the shaft, a surface of the first arm contacts a surface of one of the plurality of teeth of the splined portion of the shaft, thereby locking the shaft within the yoke. An inward radial force applied to the second arm causes the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke.

In a further embodiment of the present disclosure, a line connecting a center point of the hinge and a center line of the shaft may intersect a portion of a distal end of the first arm of the disconnect lever.

In another embodiment of the present disclosure, the line connecting the center point of the hinge and the center line of the shaft may be substantially colinear with a center line of the distal end of the first arm of the disconnect lever.

In a still further embodiment of the present disclosure, the splined portion of the shaft may comprise a first splined portion, and a circumferential groove of the shaft may disposed between the first splined portion and a second splined portion.

In another embodiment of the present disclosure, when the disconnect lever is in the first position, a portion of a distal end of the first arm may be disposed within the circumferential groove.

DETAILED DESCRIPTION OF THE INVENTION

Figure 1A:
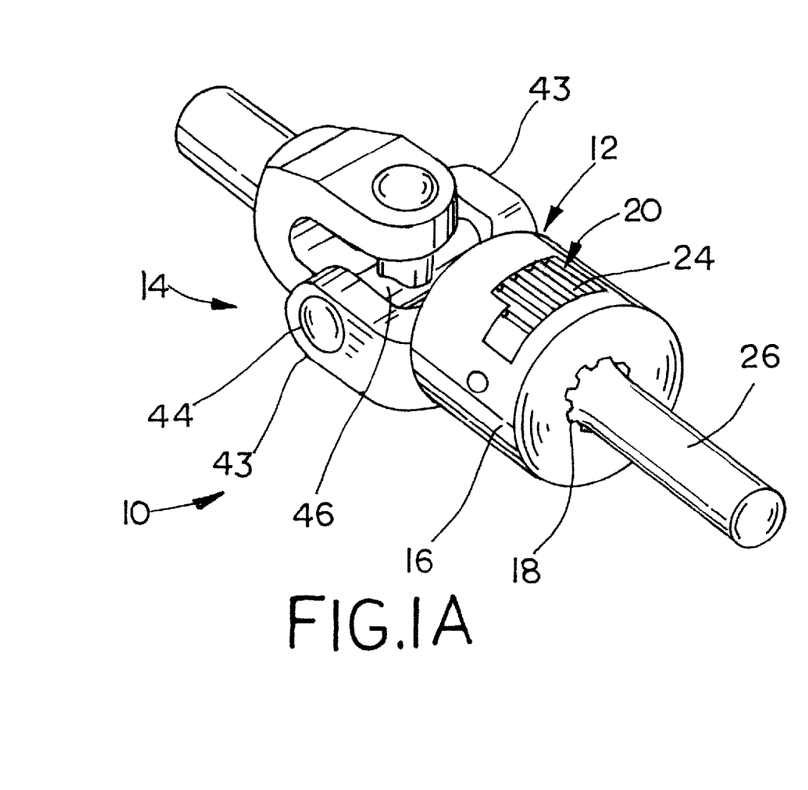
FIG. 1A is a perspective view of a universal joint of a shaft assembly including a quick disconnect yoke assembly in accordance with an embodiment of the invention.
Figure 1B:
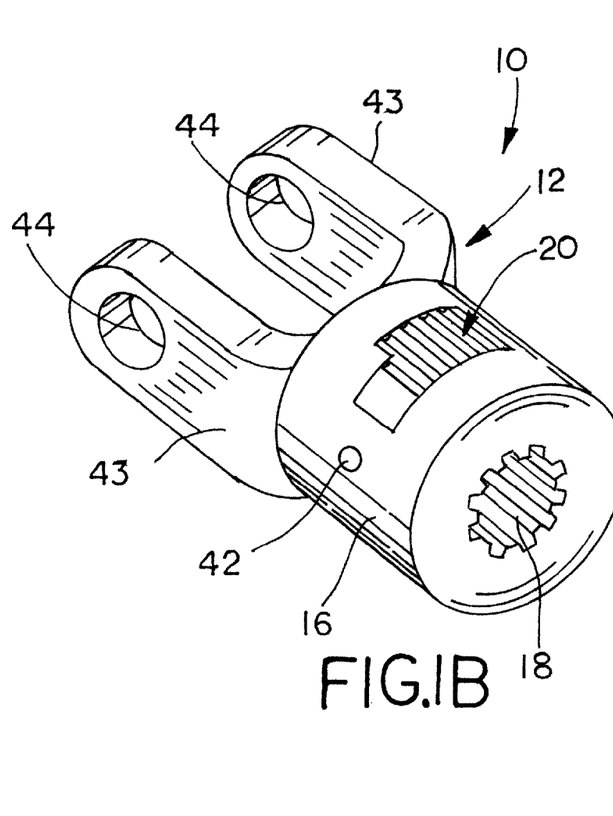
FIG. 1B is a perspective view of the quick disconnect yoke assembly in accordance with an embodiment of the invention.
Figure 4A:
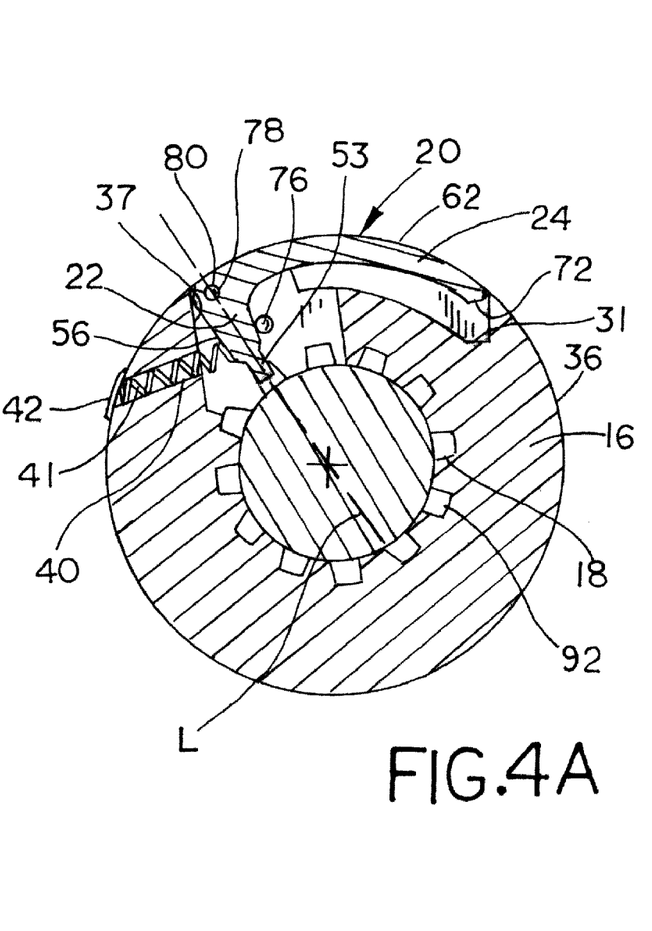
FIG. 4A is a sectional axial view of the quick disconnect yoke assembly of FIG. 1B in the first position.

As illustrated in FIGS. 1A and 1B, a quick disconnect yoke assembly 10 includes a yoke 12 adapted to engage a universal joint 14. The yoke 12 includes a bore 18 formed through the hub 16. A disconnect lever 20 is pivotably coupled to the yoke 12, and the disconnect lever 20 has a first arm 22 and a second arm 24, as illustrated in FIG. 4A. A shaft 26 is secured within the bore 18 by the disconnect lever 20 when the disconnect lever 20 is in a first position, illustrated in FIG. 4A. The shaft 26 may be removed from the bore 18 when the disconnect lever 20 is in a second position, illustrated in FIG. 4B.

As illustrated in FIGS. 1A and 1B, the yoke 12 of the quick disconnect yoke assembly 10 may include a hub 16. The hub 16 may be generally cylindrical and may have a longitudinal axis 28. The hub 16 may have a bore 18 formed along the longitudinal axis 28, and the bore 18 may be adapted to engage a shaft 26. Specifically, the surface defining the bore 18 may be splined and may be adapted to engage a corresponding splined portion of the shaft 26 such that a rotation of the hub 16 about its longitudinal axis 28 results in a rotation of the shaft 26 about its longitudinal axis, or vice versa.

Figure 2A:
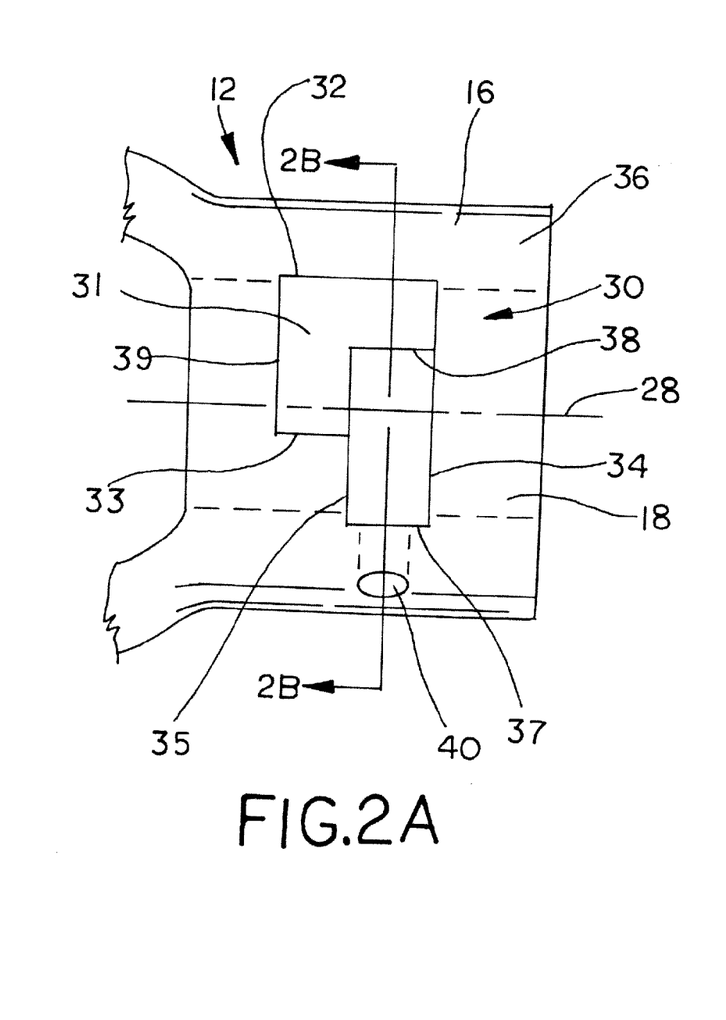
FIG. 2A is a section view of a hub of the quick disconnect yoke assembly of FIG. 1B.
Figure 2B:
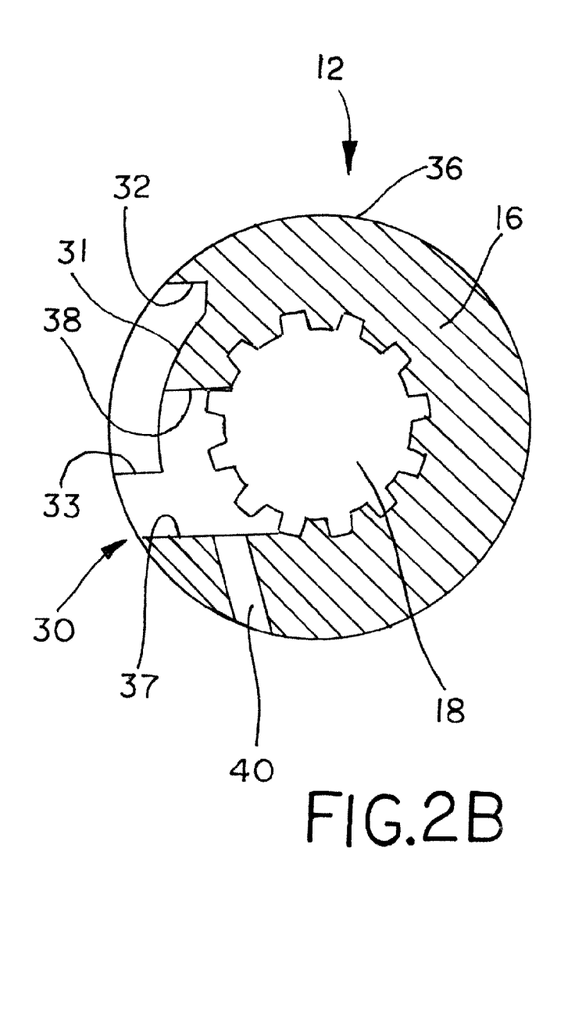
FIG. 2B is a sectional axial view of the hub of FIG. 2A.
Figure 4B:
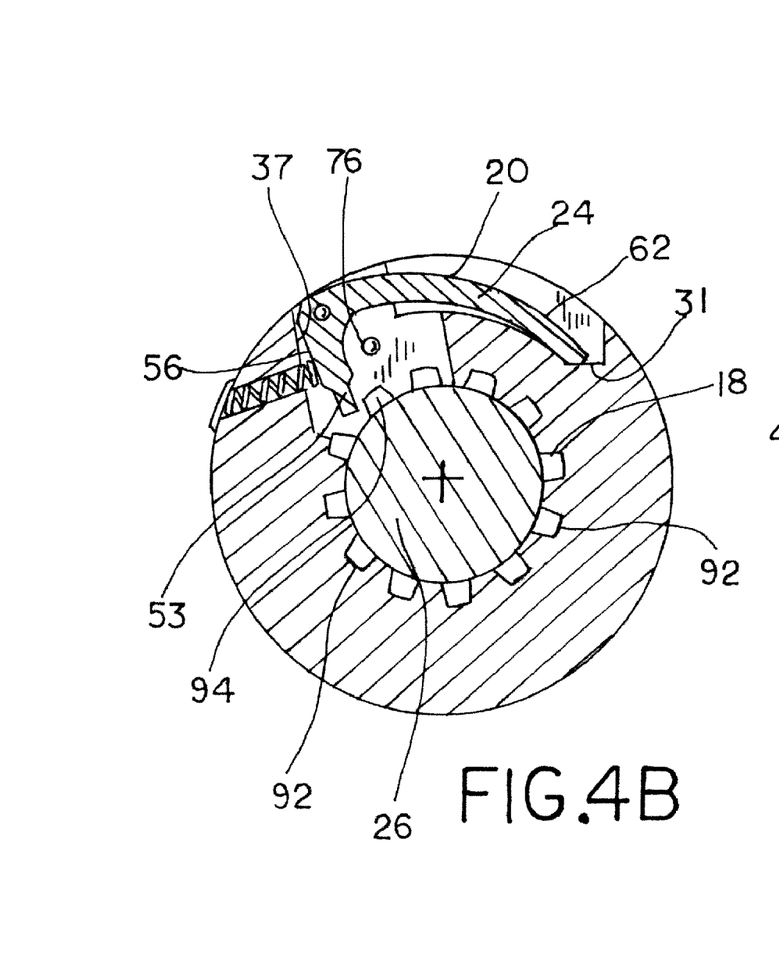
FIG. 4B is a sectional axial view of the quick disconnect yoke assembly of FIG. 1B in the second position.

As shown in FIGS. 2A and 2B, the yoke 12 may additionally include a lever pocket 30 formed in the hub 16 and adapted to receive the disconnect lever 20. The lever pocket 30 may be partially defined by a circumferential bottom pocket surface 31. The bottom pocket surface 31 may extend between a longitudinal outer ledge 32 and a longitudinal inner ledge 33. The lever pocket 30 may also include a first radial wall 34 and a second radial wall 35, and the first radial wall 34 and second radial wall 35 may extend from an outer surface 36 of the hub 16 to the bore 18. The lever pocket 30 may further include a first longitudinal side wall 37 which extends from the outer surface 36 of the hub 16 to the bore 18, and a second longitudinal side wall 38 may intersect the first radial wall 34 and may extend from the bottom pocket surface 31 to the bore 18. The lever pocket 30 may also include a third radial wall 39 that may be disposed between the inner ledge 32 and the outer ledge 33 and may extend from the outer surface 36 of the hub 16 to the bottom pocket surface 31. The yoke 12 may additionally include a cylindrical spring bore 40 linearly extending between the outer surface 36 of the hub 16 and the first longitudinal side wall 37. The spring bore 40 may be adapted to receive a return spring 41 as shown in FIGS. 4A and 4B, and the return spring 41 may be a compression spring, such as a coil spring. The spring bore 40 may also be adapted to receive a spring plug 42 that acts to secure the return spring to the yoke 12. The return spring 41 may be adapted to engage a portion of the first arm 22 of the disconnect lever 20 in a manner that will be described below.

Referring to FIGS. 1A and 1B, the yoke 12 also includes a pair of yoke arms 43 extending in a generally longitudinal direction away from the hub 12. Each of the yoke arms 43 may have a yoke aperture 44 formed therein, wherein each yoke aperture 44 extends through a distal portion of each yoke arm 40 in a direction that is generally perpendicular to the longitudinal axis 28 of the hub 16. Each yoke aperture 44 may be adapted to receive one end of a bearing hinge 46 of a universal joint 14, as shown in FIG. 1A.

The yoke 12 may be made from steel or aluminum. The yoke 12 may be integrally formed as a single component and may be manufactured using any of several known processes. For example, the yoke 12 may first be formed as a single casted part, and the splined bore 18, the lever pocket 30, and the yoke apertures 44 may each be formed by post-casting machining processes. Conversely, the yoke 12 may be an assembly of individually-formed parts. Specifically, the hub 16 may be machined and the yoke arms 44 may be formed by casting. The hub 16 may be secured to the yoke arms 44 by welding or any other method known in the art.

Figure 3A:
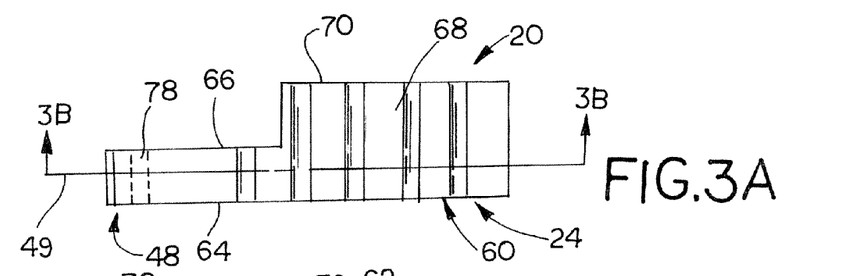
FIG. 3A is a top view of a disconnect lever of the quick disconnect yoke assembly of FIG. 1B.
Figures 3B, 3C, 3D, 3E:
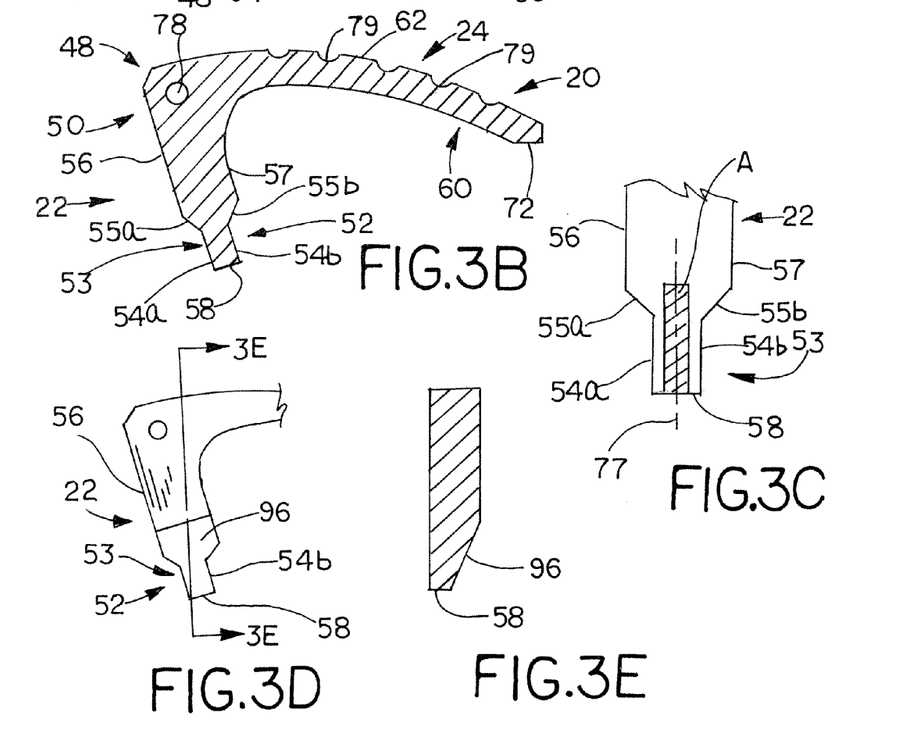
FIG. 3B is a sectional side view of the disconnect lever of FIG. 3A.
FIG. 3C is a partial side view of the disconnect lever of FIG. 3A.
FIG. 3D is a partial side view of an embodiment of the disconnect lever.
FIG. 3E is a sectional view of the disconnect lever of FIG. 3D.

As illustrated in FIGS. 1B, 3A and 3B, the quick disconnect yoke assembly 10 also includes a disconnect lever 20 pivotably coupled to the yoke 12. The disconnect lever 20 may include an first arm 22, a second arm 24, and a central portion 48 disposed between the first arm 22 and the second arm 24. The first arm 22 may extend from the central portion 48 in a first general direction when viewed normal to a longitudinal plane 49 extending through the disconnect lever 20. The first arm 22 may be oriented such that a proximal end 50 of the first arm 22 may be adjacent to the central portion 48 of the lever arm 20, and a distal end 52 of the first arm 22 may be opposite the proximal end 50. The distal end 52 of the first arm 22 may include an arm protrusion 53. The arm protrusion 53 may be partially defined by a first side wall 54a and a second side wall 54b parallel to the first side wall 54a. A first oblique wall 55a may extend from the first side wall 54a to a front surface 56 of the first arm 22, and a second oblique wall 55b may extend from the second side wall 54b to an inside surface 57 of the first arm 22. A bottom wall 58 may extend between the first side wall 54a and the second side wall 54b.

Referring again to FIGS. 3A and 3B, the second arm 24 may extend from the central portion 48 is a second general direction when viewed normal to the longitudinal plane 49 extending through the disconnect lever 20. The second arm 24 may be oriented such that a proximal end 58 of the second arm 24 may be adjacent to the central portion 48 of the lever arm 20, and a distal end 60 of the second arm 24 may be opposite the proximal end 58. The second arm 24 may extend away form the central portion 48 such that an outer surface 62 of the second arm 24 has the same radius of curvature as the outer surface 36 of the hub 16. The lateral surfaces of the disconnect lever 20 may be at least partially defined by a generally planar first lever side wall 64 and a generally planar second lever side wall 66, and both the first lever side wall 64 and the second lever side wall 66 may be parallel to the longitudinal plane 49 extending through the disconnect lever 20. The disconnect lever 20 may also have a lateral protrusion 68 extending from the distal end 60 of the second arm 24 in a direction normal to the longitudinal plane 49 extending through the disconnect lever 20. The lateral protrusion 68 may be partially defined by a third lever side wall 70 that may be parallel to the first lever side wall 64 and second lever side wall 66.

The disconnect lever 20 may also include a second arm stop surface 72 located proximate to the distal end 60 of the second arm 24, and the second arm stop surface 72 may be a planar surface extending in a direction normal to the longitudinal plane 49 extending through the disconnect lever 20. A hinge aperture 78 may be formed in the disconnect lever 20. The hinge aperture 78 may extend between the first lever side wall 64 and the second lever side wall 66, and the hinge aperture 78 may have a longitudinal axis that extends in a direction normal to the longitudinal plane 49 extending through the disconnect lever 20.

The outer surface 62 of the second arm 24 may be marked or otherwise identified to help locate the disconnect lever 20 in situations when it may be difficult to see the disconnect lever 20. For example, the disconnect lever 20 may be colored differently than the yoke 12. Alternatively, surface bumps or other discernable surface textures, such as an array of radial grooves 79, may be disposed on the outer surface 62 of the second arm 24. Raised or recessed text (such as the word "PUSH") may also be provided on the on outer surface 62. The disconnect lever 20 may be machined from steel or aluminum.

As shown in FIGS. 4A and 4B, the disconnect lever 20 may be coupled to the yoke 12 by a linear hinge pin 80 inserted through the hinge aperture 78 of the disconnect lever 20 such that a longitudinal axis of the hinge pin 80 is colinear with the longitudinal axis of the hinge aperture 78. The hinge pin 80 may be secured between the first radial wall 34 and the second radial wall 35 of the lever pocket 30 such that the disconnect lever 20 pivots within the lever pocket 30 between a first position and a second position. In the first position, illustrated in FIG. 4A, the return spring 41 within the spring bore 40 may act on the front surface 56 of the first arm 22 and rotate the disconnect lever 20 about the hinge pin 80 in a counterclockwise direction until the rear surface 57 of the first arm 22 contacts a stop pin 76 secured between the first radial wall 34 and the second radial wall 35 of the lever pocket 30. In this first position, the outer surface 62 of the second arm 24 may be co-extensive with the outer surface 36 of the hub 16. To move the disconnect lever from the first position to the second position, an inward radial force is applied normal to the outer surface 62 of the second arm 24, and the disconnect lever 20 rotates about the hinge pin 80 in a clockwise direction until the second arm stop surface 72 contacts the bottom pocket surface 31 of the lever pocket 30, as illustrated in FIG. 4B.

Figure 5A:
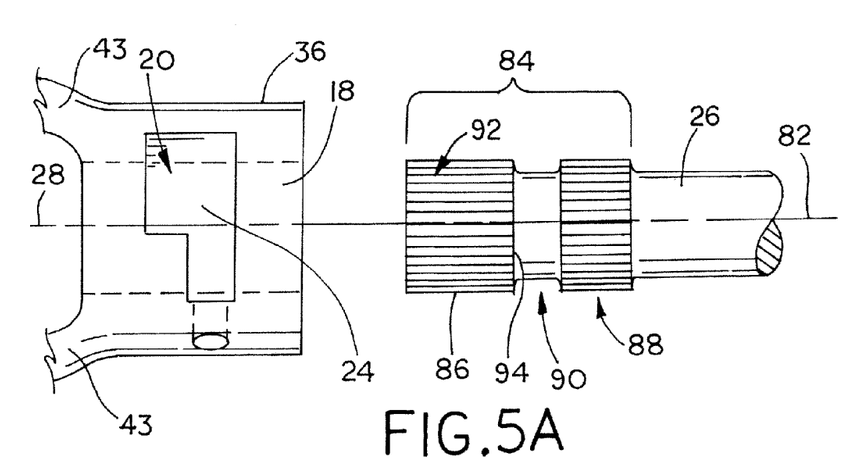
FIG. 5A is a top view of a shaft axially aligned with the quick disconnect yoke assembly of FIG. 1B.
Figure 5B:
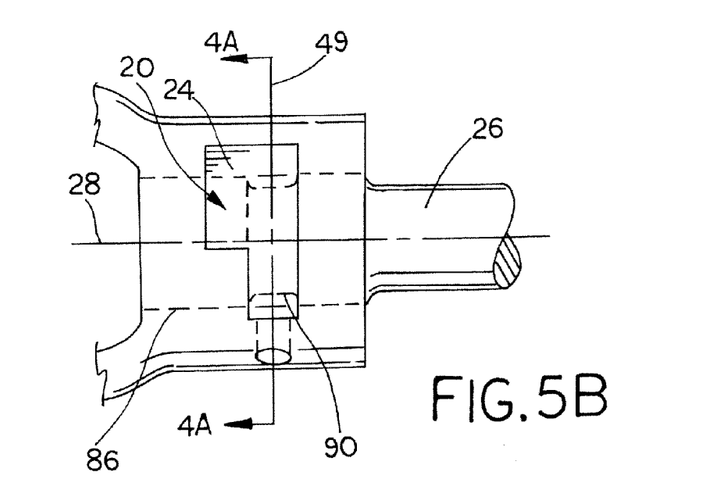
FIG. 5B is a partial sectional top view of the shaft inserted into the quick disconnect yoke assembly of FIG. 1B.

As previously mentioned, and as illustrated in FIGS. 1A, 5A, and 5B, the quick disconnect yoke assembly 10 also includes a shaft 26 having a longitudinal axis 82 that may be colinear with the longitudinal axis 28 of the hub 16 when the shaft 28 is received into the bore 18. A terminal end 84 of the shaft 26 may include a first portion 86, a second portion 88, and a circumferential groove 90 disposed between the first portion 86 and the second portion 88. Both the first and second portions 86, 88 may be splined such that the first and second portions 86, 88 may be received into the splined bore 18 of the yoke 12. The splined first and second portions 86, 88 may each include a plurality of teeth 92 radially arrayed along the circumference of the first and second portions 86, 88. The plurality of teeth 92 may be arrayed such that a profile of the first splined portion 86 and a profile of the second splined portion 88 may be identical when viewed along the longitudinal axis 82 of the shaft 26. A major diameter of each of the first and second portions 86, 88 may be greater than a diameter of the shaft 26, and a longitudinal length of the first splined portion 86 may be greater than that of the second splined portion 88. An outer diameter of the circumferential groove 90 may be the same as the outer diameter of the shaft 26, and a width of the circumferential groove 90 may be greater than a distance between the first lever side wall 64 and the second lever side wall 66 of the disconnect lever 20. Additionally, the circumferential groove 90 may extends around the entire circumference of the shaft 28.

When it is desired to connect the shaft 26 to the yoke 12 of the universal joint 14, the longitudinal axis of the shaft 82 may be aligned with the longitudinal axis 28 of the hub 16 as illustrated in FIG. 5A, and the first portion 86 of the terminal end 84 of the shaft 26 may be inserted into the bore 18 formed in the hub 16. Prior to the first portion 86 reaching the first lever side wall 64 of the disconnect lever 20, an inward radial force may be applied to the second arm 24 in the manner described above, thereby moving the disconnect lever 20 from the first position to the second position. In the second position, as shown in FIG. 4B, the front surface 56 of the first arm 22 may be proximate to the first longitudinal side wall 37 of the lever pocket 30 such that the arm protrusion 53 of the first arm 22 does not block any of the spline grooves defining the bore 18 that are adapted to accept the teeth 92 of the first portion 86 of the terminal end 84 of the shaft 26.

When the first portion 86 of the shaft 26 approaches the end of the bore 18, the shaft 26 reaches a position in which the longitudinal plane 49 of the disconnect lever 20 is aligned with the center of the circumferential groove 90 of the shaft 26 as shown in FIG. 5B. When this point is reached, the inward radial force applied to the second arm 24 of the disconnect lever 20 may be released. As the force is released, the return spring 41 may pivot the disconnect lever 20 from the second position to the first position in the manner previously described. When in the first position, as illustrated in FIG. 4A, the first arm 22 may rotate into a position where the arm protrusion 53 of the first arm 22 blocks one of the splined grooves comprising the bore 18 such that a line L drawn between a center of the hinge pin 80 and a center line of the shaft 26 intersects a portion of the arm protrusion 53 of the first arm 22. Specifically, the line L may be colinear with a center line 77 of the arm protrusion 53 such that the line L intersects a center point of the bottom wall 57 of the first arm 22. However, the line L may intersect any point within an area A comprising the middle fifty percent (illustrated as the shaded area A in FIG. 3C) of the arm protrusion 53. In the first position, the bottom wall 58 of the arm protrusion 53 may be proximate to, but not touching, the surface of the circumferential groove 90. Also in this first position, an inside radial surface 94 of the tooth 92 contacts the second lever side wall 66 if the shaft 26 is longitudinally displaced away from the yoke 12, thus preventing the shaft 26 from de-coupling from the yoke 12 when the shaft 26 is rotating or when the shaft 26 is stationary.

When it is desired to de-couple the shaft 26 from the yoke 12, an inward radial force may be applied to the second arm 24 of the disconnect lever 20 as previously described, moving the disconnect lever 20 from the first position to the second position. In the second position, as shown in FIG. 4B, the first arm 22 of the disconnect lever 20 may be in a position where the arm protrusion 53 of the first arm 22 no longer blocks one of the splined grooves comprising the bore 18, thereby allowing the shaft 26 to be longitudinally displaced away from the yoke 12 and removed from the bore 18.

In an alternative embodiment, shown in FIGS. 3D and 3E, the distal end 52 of the first arm 22 may include a ramped surface 96 that tapers towards the bottom wall 58 of the arm protrusion 53 of the first arm 22. The ramped surface 96 may be shaped such that when the disconnect lever 20 is in the first position, an axial force on the ramped surface 96 provided by the one of the plurality of teeth 92 of the first portion 86 of the shaft 26 entering the bore 18 pivots the disconnect lever 20 from the first position to the second position. When the shaft 26 reaches a position in which the longitudinal plane 49 of the disconnect lever 20 is aligned with the center of the circumferential groove 90 of the shaft 26, the disconnect lever 20 may be pivoted into the first position by the return spring 41, thereby securing the shaft 26 within the bore 18 of the yoke 12 as previously described. To disconnect the shaft 26 from the yoke 12, an inward radial force may be applied to the second arm 24 of the disconnect lever 20 to move the disconnect lever 20 from the first position to the second position, allowing the shaft 26 to be removed from the bore 18 of the yoke 12 as previously described.

While various embodiments have been described above, this disclosure is not intended to be limited thereto. Variations can be made to the disclosed embodiments that are still within the scope of the appended claims. For example, the surface defining the bore 18 may not be splined, but may instead incorporate alternate rotational couplings between the shaft 26 and the hub 16. For instance, the bore 18 may be adapted to engage a keyed shaft (not shown), and the bore 18 may have one or more radial protrusions (not shown) adapted to engage corresponding key slots (not shown) formed on the shaft to transmit rotary motion from the shaft to the hub, or vice versa.

What is claimed is:
1. A quick disconnect yoke assembly, the yoke assembly comprising:
   a yoke adapted to engage a universal joint;
   a bore formed along a longitudinal axis of the yoke,
   a shaft comprising a splined portion having a plurality of teeth and a circumferential groove disposed adjacent the splined portion, wherein the splined portion is adapted to be received into the bore; and
   a disconnect lever pivotably coupled to the yoke about a longitudinal hinge and pivotable between a first position and a second position, the disconnect lever having a first arm and a second arm,
   wherein in the first position, the first arm engages the circumferential groove of the shaft such that if an outward longitudinal force is applied to the shaft, a surface of the first arm contacts a surface of one of the plurality of teeth of the splined portion of the shaft, thereby locking the shaft within the yoke, and wherein an inward radial force applied to the second arm causes the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke, and wherein a line connecting a center point of the hinge and a center line of the shaft intersects a portion of a distal end of the first arm of the disconnect lever.

2. The quick disconnect yoke assembly of claim 1, wherein the line connecting the center point of the hinge and the center line of the shaft is colinear with a center line of the distal end of the first arm of the disconnect lever.

3. The quick disconnect yoke assembly of claim 1, wherein the line connecting the center point of the hinge and the center line of the shaft is substantially colinear with a center line of the distal end of the first arm of the disconnect lever.

4. The quick disconnect yoke assembly of claim 1, wherein the line connecting the center point of the hinge and the center line of the shaft intersects the middle fifty percent of the distal end of the first arm of the disconnect lever.

5. The quick disconnect yoke assembly of claim 1, wherein the portion of the distal end of the first arm of the disconnect lever comprises an arm protrusion, and the line connecting the center point of the hinge and the center line of the shaft intersects the middle fifty percent of the arm protrusion.

6. The quick disconnect yoke assembly of claim 1, wherein the splined portion of the shaft comprises a first splined portion, and the circumferential groove of the shaft is disposed between the first splined portion and a second splined portion.

7. The quick disconnect yoke assembly of claim 6, wherein the circumferential groove extends around the entire circumference of the shaft.

8. The quick disconnect yoke assembly of claim 1, wherein the hinge pivotably coupling the disconnect lever to the yoke extends through a central portion of the disconnect lever.

9. The quick disconnect yoke assembly of claim 8, wherein the first arm extends from the central portion in a first direction and the second arm extends from the central portion in a second direction.

10. The quick disconnect yoke assembly of claim 9, wherein the yoke comprises a hub having a substantially cylindrical outer surface, and an outer surface of the second arm of the disconnect lever is substantially co-extensive with the outer surface of the hub when the disconnect lever is in the first position.

11. The quick disconnect yoke assembly of claim 10, wherein the yoke and hub are integrally formed.

12. The quick disconnect yoke assembly of claim 8, wherein the disconnect lever is disposed within a lever pocket formed in the yoke.

13. The quick disconnect yoke assembly of claim 1, further comprising a radial spring bore formed in the yoke and extending through a surface defining the lever pocket.

14. The quick disconnect yoke assembly of claim 13, further comprising a spring disposed in the spring bore, wherein the spring biases the disconnect lever in the first position.

15. The quick disconnect yoke assembly of claim 14, wherein the spring provides an inward radial force on a surface of the first arm to bias the disconnect lever in the first position.

16. The quick disconnect yoke assembly of claim 15, wherein a surface of the first arm of the disconnect lever engages a stop pin disposed within the lever pocket to maintain the disconnect lever in the first position.

17. The quick disconnect yoke assembly of claim 16, wherein a second stop surface disposed adjacent to a distal end of the second arm of the disconnect lever engages a surface defining the lever pocket to maintain the disconnect lever in the second position.

18. The quick disconnect yoke assembly of claim 1, wherein the first arm comprises a ramped surface, the ramped surface allowing the disconnect lever to be pivoted from the first position to the second position by one of the plurality of teeth of the splined portion of the shaft as the shaft is inserted into the bore.

19. A method for disconnecting and connecting a shaft to a yoke of a universal joint, the method comprising:

providing the yoke of the universal joint, wherein the yoke comprises a longitudinal bore adapted to receive a shaft;

pivotably coupling a disconnect lever to the yoke such that when the disconnect lever is in a first position, the shaft can be inserted or removed from the bore of the yoke, and when the disconnect lever is in a second position, the shaft is secured within the bore of the yoke;

wherein the shaft comprises a splined first portion comprising a plurality of teeth, a splined second portion comprising a plurality of teeth, and a circumferential groove disposed between the first portion and the second portion, and wherein the disconnect lever comprises a first arm and a second arm; and wherein in the first position, the first arm engages the circumferential groove of the shaft such that if an outward longitudinal force is applied to the shaft, a surface of the first arm contacts a surface of one of the plurality of teeth of the splined portion of the shaft, thereby locking the shaft within the yoke.

20. The method of claim 19, wherein an inward radial force applied to the second arm causes the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke.

21. The method of claim 19, further comprising biasing the disconnect lever in the first position using a spring.

22. The method of claim 19, further comprising providing a force to the disconnect lever to pivot the lever from the first position to the second position.

23. The method of claim 19, further comprising aligning a pivoting axis of the disconnect lever, a center line of the shaft, and a first arm of the disconnect lever such that a line connecting the pivoting axis of the disconnect lever and the center line of the shaft intersects a portion of a distal end of the first arm of the disconnect lever.

24. A quick disconnect yoke assembly, the yoke assembly comprising:

a yoke adapted to engage a universal joint;

a bore formed along a longitudinal axis of the yoke, wherein the bore is adapted to receive a splined portion of a shaft, the splined portion of the shaft comprising a plurality of teeth; and a disconnect lever pivotably coupled to the yoke about a longitudinal hinge and pivotable between a first position and a second position, the disconnect lever having a first arm and a second arm, wherein in the first position, the first arm is disposed adjacent to the splined portion such that if an outward longitudinal force is applied to the shaft, a surface of the first arm contacts a surface of one of the plurality of teeth of the splined portion of the shaft, thereby locking the shaft within the yoke, and wherein an inward radial force applied to the second arm causes the disconnect lever to pivot to the second position such that if an outward longitudinal force is applied to the shaft, the surface of the first arm does not contact the surface of the one of the plurality of teeth of the splined portion of the shaft, thereby allowing the shaft to be removed from or inserted into the yoke.

25. The quick disconnect yoke assembly of claim 24, wherein a line connecting a center point of the hinge and a center line of the shaft intersects a portion of a distal end of the first arm of the disconnect lever.

26. The quick disconnect yoke assembly of claim 25, wherein the line connecting the center point of the hinge and the center line of the shaft is substantially colinear with a center line of the distal end of the first arm of the disconnect lever.

27. The quick disconnect yoke assembly of claim 24, wherein the splined portion of the shaft comprises a first splined portion, and a circumferential groove of the shaft is disposed between the first splined portion and a second splined portion.

28. The quick disconnect yoke assembly of claim 27, wherein when the disconnect lever is in the first position, a portion of a distal end of the first arm is disposed within the circumferential groove.

* * * * *